(12) United States Patent
Schulze

(10) Patent No.: US 6,305,418 B1
(45) Date of Patent: Oct. 23, 2001

(54) HYDRAULIC VALVE

(76) Inventor: Eckehart Schulze, Strahlbühlstrasse 36, D-71287 Weissach (DE)

( * ) Notice: Subject to any disclaimer, the term of this patent is extended or adjusted under 35 U.S.C. 154(b) by 0 days.

(21) Appl. No.: 09/230,144

(22) PCT Filed: Jul. 18, 1997

(86) PCT No.: PCT/EP97/03869

§ 371 Date: Mar. 19, 1999

§ 102(e) Date: Mar. 19, 1999

(87) PCT Pub. No.: WO98/03811

PCT Pub. Date: Jan. 29, 1998

(30) Foreign Application Priority Data

Jul. 19, 1996 (DE) .............................................. 196 29 217

(51) Int. Cl.⁷ .................................................... F15B 13/04
(52) U.S. Cl. ................................ 137/625.23; 29/890.131; 137/315.09; 137/625.69; 251/367
(58) Field of Search ........................ 29/890.129, 890.131; 137/315.09, 625.23, 625.69; 251/367

(56) References Cited

U.S. PATENT DOCUMENTS

| | | | |
|---|---|---|---|
| 827,170 | * | 7/1906 | Murphy ................................. 251/367 |
| 3,826,282 | * | 7/1974 | Noe ................................. 137/625.69 |
| 3,976,103 | * | 8/1976 | Ostic ................................. 251/367 X |
| 4,308,892 | * | 1/1982 | Van Ausdal ..................... 137/625.23 |
| 4,794,845 | * | 1/1989 | Vick ............................. 137/625.23 X |

* cited by examiner

*Primary Examiner*—Gerald A. Michalsky
(74) *Attorney, Agent, or Firm*—Pendorf & Cutliff

(57) ABSTRACT

In a hydraulic valve (10), the housing (34) is composed of plate-shaped segments (36 to 46). Sections of longitudinal channels (96, 97) are formed by recesses having cross-section with a closed edge which overlap or are flush with corresponding channel sections of the adjacent channels. Radial channels, which are in communication with a supply connection (11, 12) or a consumer connection (13, 14) are formed by radial indentations (86 to 89) of central openings (75, 77, 79 and 81) of housing segments (38, 40, 42 and 44). Grooves (91, 92, 93 and 93) which widen the cross-section of the central housing channel (71) within which the valve piston (19) can slide in a pressure tight manner in the axial direction and/or rotation outwards are formed by recesses (75, 77, 79 and 81) of the housing segments (38, 40, 42 and 44) having a larger diameter and which positively overlap the central channel (71) in cross-section. The segment plate (36 to 46) are positively and form-fittingly joined and/or materially joined into a dimensionally stable package into which welding material is laid into closed compartments which are formed by recesses (121 to 134, 126) of the segment plates (37 to 45) interconnected into groups and which extend over the whole series of joints of the segment plates (36 to 46).

25 Claims, 9 Drawing Sheets

HYDRAULIC VALVE

BACKGROUND OF THE INVENTION

The invention concerns a hydraulic valve, in which by relative movement between a piston and a housing, which in spatially defined configuration has supply and user connections, via which pressure medium can flow from a pressure supply aggregate to a user and from this back to a supply container of the pressure supply aggregate, various defined flow paths can be selected, which are associated with various defined functions of the user, for example, forward movement, resting or backwards movement of the piston of a hydraulic cylinder, wherein in various functional positions of the hydraulic valve various respectively defined combinations of flow paths are opened or closed off or subcombinations of such paths are opened and other subcombinations closed off, wherein segments of such flow paths are formed by grooves in the housing and/or the piston as well as housing and/or piston channels, which communicatingly connect such path sections with each other or with supply or as the case may be user connections.

DESCRIPTION OF THE RELATED ART n-way/m-position-valves of this type are generally known and are offered as either switch valves which are switchable between discrete functional positions or as proportional valves which, with increasing displacement of their piston out of a base position, increasing open up a flow-path cross-section, and are offered by hydraulic component suppliers in the most compatible, that is, corresponding, variations of known configurations of their supply, user and/or control connections, so that a unit manufactured by one manufacturer is exchangeable with a corresponding unit of another manufacturer.

The housing of such valves is as a rule produced of aluminum or steel cast parts, in which at least the basic shape as defined by a central through-going housing channel, which receives the valve piston, the basic shape of this channel including widening grooves, the flow in such grooves joining lengthwise or transverse channels, which are in communicating connection with connection openings of the valve housing, as well as the flow or path of channels which internally connect housing grooves with each other without being directly in communicating connection with a supply or user connection of the valve housing, is predetermined by the shape of a cast core, which is introduced into the outer cast shape, which in turn determines the shape of the outer surfaces of the housing, wherein this cast core after the casting of the valve housing can fall apart and the core material, fine grained sand, must be quantitatively removed in a simple manner from the cast body.

This embodiment of the valve housing as cast part is completely practical in the view point of a highest possible fluid-tightness (avoidance of the requirement for an external plugging internally with each other communicating transverse and longitudinal boreholes of the housing), the mechanical load carrying capacity and also the somewhat rational manufacturing process; however it is also associated with a variety of serious disadvantages:

Even when it is so organized, that a rational manufacturing process of numerous housings is possible in a single casting process, the production of the cast core is associated with a high technical demands, which is expensive.

The shapes of the housing hollow spaces in the housing, which during casting are filled with sand kernels, must be so constructed or shaped, that the kernel material after the casting is reliably removable after casting. Herein it is required, for reasons of the sufficient stability of the casting kernels, that minimum cross-sections of cast core batches are required, which for example connect housing internal grooves of the central housing channel with each other.

Since a follow-up processing of the central channel of the cast housing, for example with conventional penetrating tools, is unavoidable in order to achieve sufficiently precise housing side control edges, through which by positive or negative overlapping with piston side control edges the various functional positions of the valve are achievable, the axial separation of such housing side control edges must as a rule be selected to be substantially greater than would be necessary from flow technical reasons. The manufacturing length of the known valves is thus for reasons of product finishing as a rule significantly greater than would be required for physical reasons. Correspondingly, the axial dimensions of the pistons in linear displacement valves must be greater, which also results in a corresponding enlargement of their mass.

SUMMARY OF THE INVENTION

The task of the invention is thus, to improve a hydraulic valve of the above-described type such that it can be manufactured, without detracting from the functional characteristics and the precision of the arrangement and construction of its control edges as well as with a good sealing of the housing, with substantially less expenditure and also can be produced with significantly smaller spatial dimensions.

According thereto the housing of the valve is assembled from planar-parallel, plate-shaped segment-sheets, in which segments of longitudinal channels of the housing are formed by clearances having a cross-section with a closed edge, which overlap or are aligned with corresponding channel sections of adjacent channels; radial channels or segments of such channels, which are connected in communication with a supply connection or a user connection, are formed by radial bulges of central openings of the housing segments, which are oriented or provided along a common central longitudinal axis; the cross-section of a housing channel defined by the edges of a central opening, within which the valve piston in pressure type manner is axially displaceable and/or rotationally turnable, radial widening grooves are formed by clearances of larger diameter of the housing segment which positively overlap the central channel in cross-section; the segment plates are materially joined by brazing, wherein during the brazing process they are positively and form-fittingly joined or in certain cases materially joined into a dimensionally stable package; a brazing material required for the mechanically secure material joining of the segment plates is introduced into enclosed compartments, which are formed by group-wise interconnecting clearances of the segment plates and which extend over the entire series of the segment plates.

By this design of the inventive valve technical advantages are achieved including at least the following: The clearances or through-holes of the individual segment sheets can be produced on NC- or CNC-controlled bore and/or punching or stamping machines with high precision, wherein also channel paths can be produced in simple manner, which in casting technology practically are not realizable or are realizable only at great expense.

Since axial groove widths are determined in simple manner by the thickness of the segment sheets, which by the edge of their clearances determines the flow path of the groove base, such groove widths can in simple manner be limited to the physically required minimal value and for example in the case of magnet controlled linear displacement valves, can be tailored to the lift or stroke of the available control magnets, whereby shortenings of the axial construction length of the valve housing can be achieved which correspond to 30% of the construction length of a conventional valve housing. The mass of the piston is also reduced by a corresponding percentage value.

The thin brazed layers, which are produced as a result of the capillary action between the sheet metal plate segments, produce an absolute tight and secured connection of the housing segments with each other. The sealing and mechanical load capacity of the housing is equivalent to that of a conventional cast housing. It can further be said that the casting flaws which are statistically unavoidable with cast housings, for example contraction cavities, cannot occur, so t hat the valve housings produced according to the invention are produced with a statically lower reject quota. As a result of providing the brazing material in closed compartments, there is also made possible a very precise measurement of the brazing amount for the respective segment plate surfaces to be brazed to each other.

It can also be advantageous when the receiving space for the wire shaped brazing material is designed as a confluent channel, which, running meanderingly or spiral shaped, extends through the housing and in the finished valve is usable as a flow-through *channel for cooling medium or gas. Such a channel can be produced during the construction process intended for producing the housing without difficulty, such that the cooling fluid flows through the thermally particularly stressed z ones of the valve housing and that in accordance therewith a effective removal of heat is possible.

By the possibility of producing enclosed hollow spaces, which in casting technology is not possible, it is also possible to realize a light construction manner with substantial weight savings, without having to sacrifice stability. Further there exits the possibility, to connect relatively large volume spaces with small channels, in order for example to achieve the effect of a buffer.

A follow-up processing of the housing is essentially necessary only in the manner, that the respective circular spaced, central openings of the housing segment, in which the valve piston is mounted pressure-tight rotatably or axially slidable, are to be brought into exact corresponding diameter and exact aligned arrangement with each other. Given as preconditions the manufacturing precision which is conventional for NC- and CNC-controlled processing machines for the individual plate segments of the housing as well as their positionally correct form-fixing prior to the brazing process, which is achievable without more by simple alignment aids, the follow up processing of the housing can as a rule be limited to the honing processing of the central clearance of the segment plates, which is not associated with a seam forming of the control edges, which from the manufacturing technical prospective is likewise of substantial advantage. The inventive valve is thus overall substantially more economical to produce than the valve with a housing formed by casting technology.

For the arrangement of reception channels for brazing material, which extend over the entire length between the end plates of the segment package, or only over segments thereof, however are in positive overlap with each other, at least in all cases are interrupted by only one segment from each other, it is in each case advantageous, when such receiver channels are arranged axially symmetric with respect to the central longitudinal axis of the central housing channel, that is, in areas, which correspond respectively approximately to the radial separation from the at the furthest removed surface areas which must be joined by brazing.

For positionally correct prefixing of the segment plates to each other as required prior to the brazing process, fixing posts can be used which extend between the end segments of the segment packages and transition through clearances of the plate shaped segments aligned with each other and in a form of post-like pull anchors secured to one or the other of the end segments, which is riveted on the other side of the package with the there situated end plate, but also "loose" fixing posts, which are riveted respectively with both end plates of the segment package. In each case it is advantageous when the diameter of the fixing posts correspond to the diameter of the alignment clearances of the housing segments, so that the fixing posts are also useable for the mutual or inter-changeable centering adjustment of the segment plates.

The positionally correct prefixing of the segment plates for the brazing process is also possible in the manner, that the segment plate package is form fittingly held together by caulking anchoring bodies laid into edge opening recesses of the edges of the plate shaped segments aligned with each other, wherein the edge openings, with each other aligned recesses preferably form a longitudinal groove with a towards outwards narrowing trapezoid cross-sectional shaped interstitial space, and the anchoring bodies are formed as flat or shallow arched posts or slats, which by pressing into the groove achieve the form locking anchoring of the plate shaped segments.

A suitable form-stable fixing of the segment package of the housing can also be thereby achieved, when the segment plates are materially joined or bonded with each other by small welding beads, which in suitable, preferably axially symmetric arrangement are applied over the plate joints. It is a precondition for this, that the segment plates during the welding or brazing can be held to each other in their characteristic configuration necessary for the finished housing.

A positionally correct fixing of the plate shape segments to each other, which is at the same time automatic, is also thereby achievable, in that segment plates arranged adjacent each other are provided with co-axial projections and clearances of approximately complimentary shape and the segment plates are form fixably joined to each other by pressing in of the projections into the clearances of the adjacent segment plate(s).

This type of positionally correct fixing of the segment plates to each other is, when these are constructed to be relatively thick, possible from the manufacturing technology in a simple manner thereby, that the projections are formed by the material from the stamped-out cavities, wherein the stamp stroke penetrates only through a portion, preferably the major portion, of the material thickness of the respective segment plate.

When the thickness of such plate shaped segments of the housing, in which the edge of their central clearances respectively define the groove basis of a groove extending through the central channel of the housing, the axial separation of the groove side wall forming segment plates or one of the natural break of these separation corresponding and/or the thickness of the plate segments, the groove side wall of two by a ring flange with respect to each other bordered housing ring grooves form, the thickness of the respective ring flanges or a natural break of the same correspondence, so can in principle all plate shape segments of the valve housing have the same thickness or be assembled of segment elements of the same thickness.

Consequently following of the inventive concept the valve piston can also be comprised of solidly with each other welded circular disk shaped segment plates, according to the base shape, so that also the axial width and radial depth of grooves of the piston and the thickness of such grooves with respect to each other separated piston flanges can be determined by the thickness of the segment plates or as the case may be a multiple of a minimum thickness.

The same is valid in concept for an intermediate sleeve introduced in the central channel of the housing, which coaxially encompasses the piston and for its part is comprised of ring disk shaped, solidly welded to each other segments of the same internal diameter $d_i$.

Such an intermediate sleeve can in alternative embodiments of the valve be fixedly connected with the housing thereof or fixedly connected with the relative to the housing moveable valve piston and makes possible in both cases in simple manner the realization of ring channels of the housing, for example the piston, which channels form the flow paths of the valves. The intermediate sleeve can however also be formed of a moveable valve element moveable relative to the housing and a central, rigidly with this connected piston, via the displacement or rotational turning of which the various functional positions of the valve are selectable.

In a preferred embodiment of the inventive valve both the piston thereof as well also the intermediate sleeve thereof are formed moveable with respect to each other and relative to the housing.

In this embodiment the valve can be formed as servo-regulator valve, in which either the piston is employed as the desired position input element and the intermediate sleeve as the actual value feedback element or the housing as desired value input element and the piston as actual feedback element.

The until now described form of the valve housing, the piston and a piston coaxially encompassing intermediate sleeve is particularly suitable for an embodiment of the valve as turn slide valve, with easy movement of the valve elements relatively to each other, without detracting from the good sealing of the separation of flow paths set under high pressure against those which are in lower pressure levels, for example the ambient pressure.

BRIEF DESCRIPTION OF THE DRAWINGS

Further details of the inventive hydraulic valve can be seen from the following description of illustrative embodiments of the same by reference to the drawings. There are shown.

DETAILED DESCRIPTION OF THE INVENTION

Figure 1:
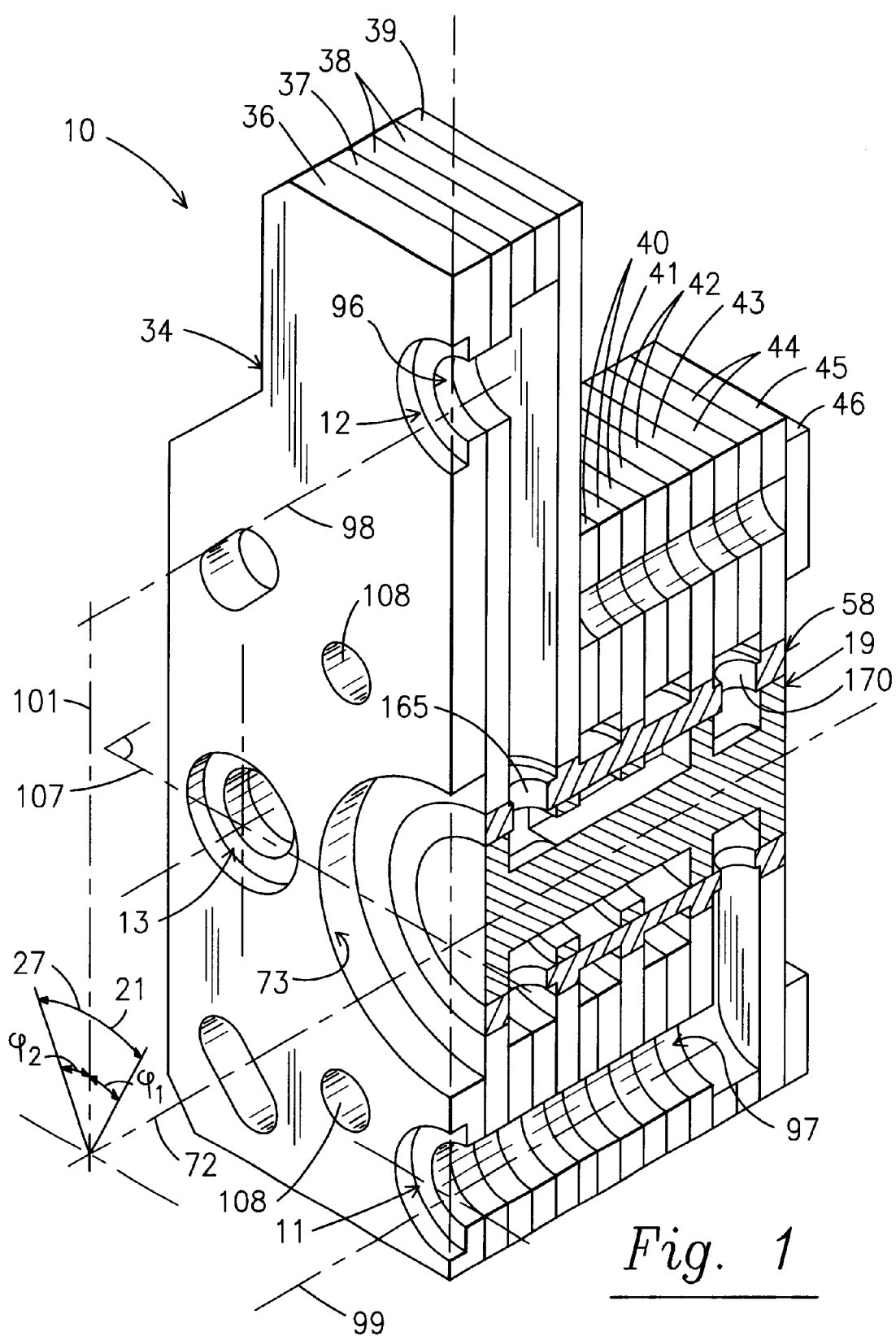
FIG. 1 an inventive hydraulic valve with a housing formed of assembled plate shaped segments in schematic simplified prospective representation, partially in section along a vertical longitudinal middle plane of the housing along its central longitudinal axis as well as the longitudinal axis of pressure (P) and tank (T)-connection channels of the valve, partially as a view of its connection side outer surface, FIG. 1a the valve according to FIG. 1 in section along its vertical longitudinal middle plane, FIG. 1b the valve according to FIG. 1 in section along its transverse middle plane which contains the central longitudinal axis and extends at a right angle to the vertical longitudinal middle plane, FIG. 1c the housing of the valve according to FIG. 1, in a sectional representation corresponding to FIG. 1, FIG. 1d a view of the housing segment adjacent the connection side end segment of the housing, FIG. 2 a simplified hydraulic switch diagram for explanation of the function of the valve according to FIG. 1, FIG. 3 the plate shaped segments of the valve housing as well as likewise also plate shaped segment designed elements of the valve piston and one of the piston within the central valve housing channel coaxial surrounding intermediate sleeve in exploded, simplified perspective representation, the piston and intermediate sleeve segments in enlarged scale in comparison to the representation of the housing segment, FIG. 3a a part of the piston and jacket segment according to FIG. 3 in comparatively enlarged scale, FIG. 4 a further embodiment of a valve which is a constructional and functional analog of the hydraulic valve according to FIG. 1, and FIG. 5 a servo-hydraulic valve in a supplied embodiment which is a constructional analog to the valve according to FIG. 1.
Figure 2:
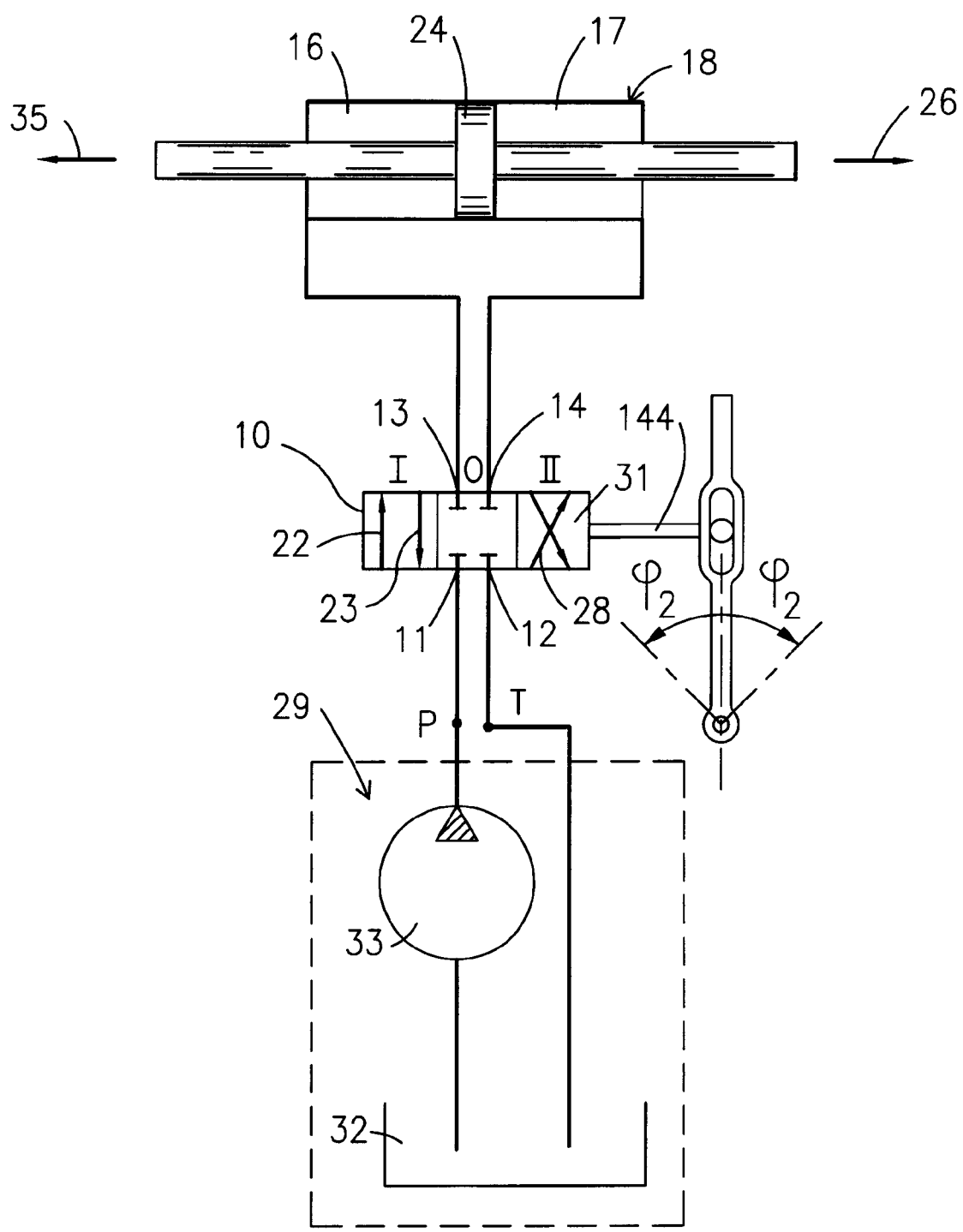
Figure 3:
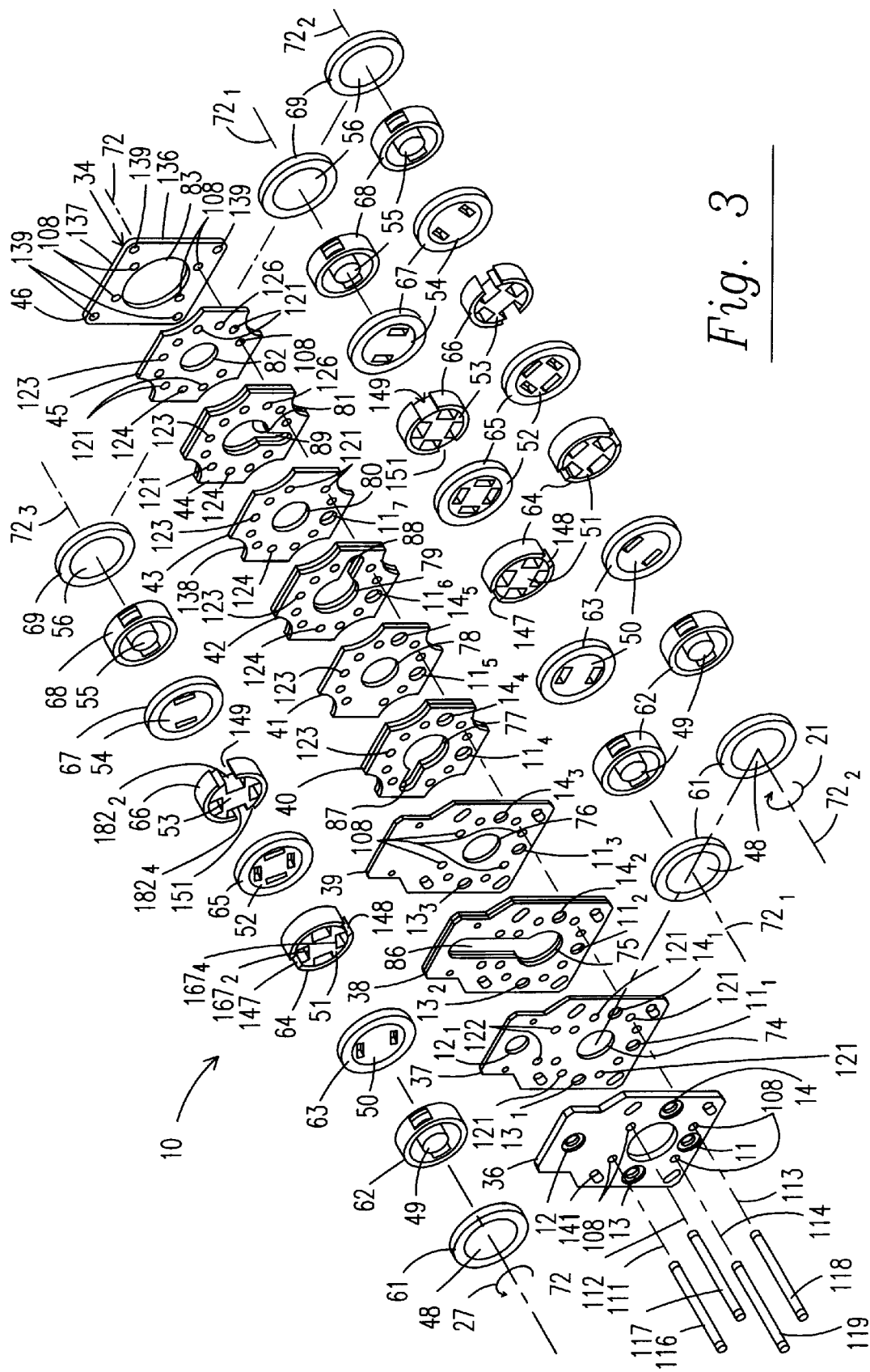

The hydraulic valve referenced overall in FIGS. 1 through 3 with is for purposes of explanation, without reduction of the scope of the invention, formed as a rotary slide valve, which has the function of a 4/3-way proportional valve. It has a blocking base position 0 in which a pressure (P) supply source connection 11 as well as a return flow (T) connection 12 are blocked against a user (A)-connection 13 as well as against a further user (B)-connection 14, which are connected with the drive pressure spaces 16 and 17 of user represented in FIG. 2 as double acting linear hydraulic cylinder 18.

By turning of the generally with 19 indicated piston of the valve 10 in the clockwise direction represented by arrow 21 in FIG. 1 and 3 about an azimuthal amount $_1$ the valve 10 can be placed in a function position I in which via a flow path 22 over the valve 10 the one drive pressure space 16 of the hydraulic cylinder 18 is connected which the P-supply connection 11 of the valve 10 and the other drive pressure space 17 of the hydraulic cylinder 18 via a flow path 22 of the valve 10 is connected with the T-connection 12 of the valve 10, so that the piston 24 of the hydraulic cylinder 18 is moved in the direction of the arrow 26 of FIG. 2, according to the representation towards the right.

By turning of the valve piston 19 in the by the arrow 27 in FIG. 1 represented azimuthal direction$_2$, in counter-clockwise direction, so then the valve 10 comes into its functional position II which is alternative to the functional position I, in which the other drive pressure space 17 of the user 18 via a flow path 28 of the valve 10 is connected with the P-supply connection 11, on which the high output pressure P of the pressure supply aggregate 29 is available, while the in the functional position I of the valve 10 with the P-supply connection 11 of the valve 10 connected drive pressure space 16 of the user 18 now via a flow path 31 with the no-pressure tank 32 of the pressure supply aggregate 29 is connected, so that in the functional position II the valve 10 of the piston 24 of the user 18 moves to the left in the direction of the arrow 35 of FIG. 2, according to the representation.

For the valve 10 the characteristic is a presumed, that the hydraulic fluid flow, which in the functional positions I and II via the valve to the user 18 and from this can flow back into the tank 32 of the pressure supply aggregate 29, are increasingly greater, the further the piston 19 is azimuthally deflected from its functional neutral base position 0 in which the user 18 is brought to rest.

Rotary slide valves, which fulfill the above described functions, as well as also functional analog linear slide valves, are generally known also in embodiments, in which for example in the base position of the valve the P- and T-connections thereof are connected with each other, so that the pump 33 of the pressure supply aggregate 27 can be operated in a circulating operation.

In distinction to conventional valves of the known type the housing generally referenced with 34 is formed by assembly of plate shaped, steel sheet comprising segments 36 through 46, of which the large surface areas are connected with each other by brazing.

In a manner analogous to the segmented construction of the housing 34 the piston 19 of the valve 10 is formed by welding together circular disk shaped segments 48 through 56 according to the basic design.

A corresponding segmental construction is also possible for tubular shaped cylinder intermediate sleeve indicated with an overall 58, which according to the desired base shape is comprised of ring shaped, solidly with each other welded segments 61 through 69.

The housing 34 of the valve 10 has a central, through-going housing channel 71 (FIG. 1c) of segments of the length, which correspond to the thickness of the plate shaped housing segments 36 through 46, which is formed by the edges sequentially following along the central longitudinal axis 72 of the central channel 71 and into each other transitioning central openings 73 through 83 of the plate shaped housing segments 36 through 46.

The closed edged circular shaped openings 73, 74, 76, 78, 80, 82 and 83 of the plate shaped housing segments 36, 37, 39, 41, 43, 45 and 46 and the opening 75, 77, 79 and 81 of the remaining plate shaped housing segments 38, 40, 42 and 44 which have circular arch shaped edges over the main portion of the azimuthal area edged and of which the central openings are provided with slit shaped radial voids 86, 87 and 88 or as the case may be 89, are provided coaxially with respect to the central longitudinal axis 72 of the central housing channel 71.

Via ring groove segments 38, 40, 42 and 44, which are pairwise provided between ring flange-segments 37, 39, 41, 43 and 45 of the plate shaped housing segments 36 through 46, whereby the diameter $d_F$ (FIG. 1a) of the central opening 74, 76, 78, 80 and 82 of the ring flange segment 37, 39, 41, 43 and 45 of the plate shaped housing segments is somewhat smaller than that ($d_N$) of the opening of the between respectively to ring flange segments provided ring groove segments 38, 40, 42 and 44 of the housing 34, there are formed within the housing 34 central channel segmentwise radially widening ring grooves 91 through 94, namely a T-(supply)-connection groove 91, an A-(user)-connection groove 92, a B-(user)-connection groove 93 and a P-(pressure supply)-connection groove 94, wherein the A-connection groove and the B-connection grove 93 are provided between the T-connection groove 91 and the P-connection groove 94 and hereby the A-connection groove 92 is provided between T-connection groove 91 and the B-connection groove 93, which is provided adjacent the P-connection groove 94.

The connection end of the housing 34 is formed by the connection segment 36, on which, in a bore shape customary for a 4/3 way valve standard connection bore holes for the P-supply connection 11, the T-connection 12, the A-user connection 13 and the B-supply connection 14 are provided.

The ring flange segment 37 adjacent that of the connection segment 36 of the housing 34 is provided with a circular clearance $12_1$ aligned with the T-connection bore hole 12 of the connection segment 36, which together with the connection bore hole 12 forms an in the radial bulge 86 of the central opening 77 of the T-groove segment 38 connecting T-longitudinal channel 96 (FIG. 1a), which via the radial bulge 86 formed transverse channel is in continuous communicating connection with the T-connection groove 91 of the housing 34.

The associated housing segments 37 through 43 between the connection segment 36 and the P-ring groove segment 44 are provided with circular clearances $11_1$ through $11_7$ which are in alignment with the P-connection bore holes 11 of the connection segment 36 so that a continuous communicating connection exists between the P-supply connection 11 and the P-ring groove 94 of the housing 34. The central longitudinal axis 72 of the central channel 71 of the housing 34 as well as the central longitudinal axis 98 of the T-longitudinal channel 96 and the central longitudinal axis 99 of the P-channel 97 lie in a common plane 101, which according to the representation of FIGS. 1 and 1d is shown as a "vertical" longitudinal middle plane of the housing 34.

The housing segments 37, 38 and 39 provided between the connection segment 36 and the A-ring groove segment 40 are provided with round clearances $13_1$ and $13_2$ or, as the case may be, $13_3$ which are in alignment with the A-user connection bore hole 13 of the connection segment 36, which overall form an A-longitudinal channel 102 (FIG. 1b), which connects in the radial projection 87 of the central opening 77 of the A-ring groove segment 40, whereby again continuous communicating connection of the A-user connection 13 is established with the A-connection groove 92 of the housing 34.

The housing segment 37 through 41 positioned between the connection segment 36 of the housing 34 and its B-ring groove segment 42 are provided with round clearances $14_1$, a $14_2$ $14_3$, $14_4$ and $14_5$ which are in alignment with the B-connection bore holes 14 of the connection segment 36, which form a B-longitudinal channel 103, which connects in the channel formed by the radial projection 88 of the central opening 79 of the B-ring groove segment 42, which is in communicating connection with the B-ring groove 93 of the housing 34, so that also their continuous communication connection is provided with the B-use- connection 14 of the valve 10.

The central longitudinal axis 104 of the A-longitudinal channel 102 and the central longitudinal axis 106 of the B-longitudinal channel 103 lie in the right-angular to the longitudinal plane 101 of the housing 34 running transverse middle plane 107 which transects the vertical longitudinal plane 101 along the central longitudinal axis 72 of the housing 34.

The cumulative housing segments 36 through 46 are respectively provided with four circular round alignment clearances 108, which are arranged in the same, four-fold axial symmetric grouping with respect to the common central longitudinal axis 72 of the central opening 73 through 83 of the housing segments 36 through 46 and in the same radial separation from the central longitudinal axis 72 as the P-connection bore hole 11 and the A- and B-connection bore holes 13 and 14 and are pair-wise arranged in planes, which lie at 45° to the central planes 101 and 107 of the housing 34.

In the respective orientation of the plate shaped housing segments 36 through 46, in which their T-channel clearances 12 and 121$_1$ their P-channel clearances 11 and 11$_1$ through 11$_7$ as well as their A-channel clearances 13 and 131 through 133 and their B-channel clearances 14 and 14$_1$ through 14$_5$ respectively with each other align, there are also respectively eleven of the alignment bore holes 108 positioned in alignment along the central longitudinal axis 111 through 114, so that this configuration of the plate shaped housing segments 36 through 46 can be form fittingly joined by insertion of cylindrical-rod shaped fixing rods 116 through 119 of which the diameter, except for a negligible tolerance, corresponds to that of the alignment clearances 108. By riveting the ends of the fixing rods 116 through 119 with the connection segment 36 and the operation side closure segment 46 of the housing 34 these plate shaped segments 36 through 46 are cumulatively form-fittingly joined in the appropriate configuration for welding together.

The azimuthal angular separation of the vertical axis 111 through 114 of the respective with each other aligned clearances 108 from the vertical longitudinal middle plane 101 of the housing 34 corresponds, in the represented embodiment selected for purposes of explanation, to respectively 30°.

The plate shaped housing segments 37 through 45 positioned between connection segment 36 and closure segment 46, are further provided with through-going, circular-cylindrical clearances 121 of the same diameter, of which the central axis lies upon the same "bore" circle as the central longitudinal axis 111 through 114 of the alignment clearances 108 and from the vertical longitudinal middle plane 101 of the housing 34 are oriented in an angular separation of respectively 60°. These clearances 121 form the radial edges of the receiver channels for, for example, wire shaped brazing material, which extend along the length of the segment-package formed by the housing segments 37 through 45 and which are closed off to the outside by the connection segment 36 as well as by the closure segment 46 of the housing 34.

Further brazing material receiving channels, which form self enclosed bore spaces of the housing 34, are formed by pairwise with each other aligned axially, circular cylindrical clearances 122 of the housing segment 37 and 38, which between the connection segment 36 and the this oppositely lying ring flange segment 39 are positioned or oriented, which form the one side axial bordering or limitation of the A-connection groove 92.

Further self-enclosed receiving channels or chambers for brazing material are formed by circular cylindrical clearances 123 and of the same diameter, aligned with each other, in housing segments 40 through 45 between the ring flange segment 39 and the connection segment 46, wherein these clearances 123 are provided diametrically opposite to the P-longitudinal channel 97 of the housing 34.

A further brazing material receiving compartment, which is self enclosed, is bordered by aligned, circular-cylindrical clearances 124 of the respective housing segments 42 through 45, which are provided between the central ring flange segment 41 of the housing 34 and its closure segment 46.

A further, self enclosed receiving space for brazing material is finally bordered by with each aligned, circular cylindrical clearances 126 of the ring groove segment 44 and the ring flange segment 45, which are positioned between the closure segment 46 and the this adjacent ring flange segment 43 of the housing 34 and by these are closed off in the axial direction.

The central longitudinal axis of the respective brazing receiver compartments, which extend between the central ring flange segment 41 and the connection segment 46 of the housing 34, align with the central longitudinal axis 104 of the A-longitudinal channel 102 of the housing 34, while the central longitudinal axis of the shorter brazing material reception space, which extends between the closure segment 46 and the ring flange segment 43, which borders the P-groove 84 against the B-ring groove 93 of the housing 34, aligns with the central longitudinal axis 106 of the B-longitudinal channel 103 of the housing 34.

The connection segment 36, the to this adjacent ring flange segment 37, the upon this following T-ring groove segment 38 and the upon this following ring flange segment 39 of the housing 34 respectively have the same, essentially linear bordered outer contour. They have, as best seen in the detailed representation of FIG. 1d, a quadrilateral base area 127, which, right angularly to the central longitudinal center plane 101 of the housing 34 measured or determined, has the breadth B, a to this base area connecting, same sided-trapezoid shaped intermediate area 128, of which the side edges 29 enclose with the central longitudinal center plane 101 an angle of 45°, and a to the trapezoid shaped intermediate area 128 connecting, the base shape according to a right-angled head-area 131, of which the breadth measured right angularly to the vertical longitudinal center plane 101 of the housing 34 corresponds, in the embodiment selected for explanation, to ⅔ of the breadth B of the base area 127 and of which the parallel to the vertical longitudinal center plane 101 of the housing 34 measured height corresponds to ⅓ of the breadth B of the base area 127.

The connection segment 46 corresponds with respect to the extension of its outer contour and its measurement or dimension to the quadric base-area 127 of the connection segment 36 or, as the case may be, the adjacent ring flange segment 37 represented in FIG. 1d.

The housing segments 40 through 45, which are provided between the closure segment 46 and the next adjacent ring flange segment 39, of which the outer contour corresponds to that of the connection segment 36, have identical outer contours 132, drawn in FIG. 1d in dashed lines, which correspond to that of a cross, which both with respect to the vertical longitudinal center plane 101 of the housing 34 as well also with respect to the horizontal transverse center plane 107 thereof its symmetrically formed, wherein the linear running vertical and horizontal end face edges 133 and 134 of the cross shaped housing segment 40 through 45 align with vertical and horizontal limitation edges 136 or as the case may be 137 (FIG. 3) of the closure segment 46 and have the same length, which corresponds respectively to the half breadth B of the base of the closure element 46 and the connection element 36.

Between the vertical and horizontal limitation edges 133 and 134 of the cross shaped housing elements are respectively circular bowed shaped concave bent transition areas 138, of which the curvature center or focal points lie in the corners of the quadric base area 127.

The closing off segment 46 is provided with circular cylindrical through-openings 139 in proximity to its corners for not shown anchor screws, by means of which the valve 10 is screwable onto a likewise not shown connection block. These anchor screws pass along the concave bent transition edges 138 of the cross shaped housing segment 40 through 45 and pass through elongated hole shaped insertion openings 141, which in one of their arrangements of the circular round insertion openings 139 of the closing off segment 46 corresponding arrangements in immediate proximity to the corners of the quadrilateral base area 127 of the connection segment 36 and which is provided with this contour identical housing segment 37, 38 and 39, wherein the longitudinal plane 142 of the elongate hole-shaped insertion opening respectively runs at 45° to the longitudinal middle plane 101 and to the transverse middle plane 107 of the housing 34 and contain the central longitudinal axis 143 of the circular shaped insertion openings 139 of the closing off segment 46. The diameter $d_A$ (FIG. 1a) of the central opening 73 of the connection segment 36 is somewhat larger than the diameter $d_F$ of the central opening 74 of the adjacent housing segment 37. Via the central opening 73 of the connection segment 36 waste oil exiting from the valve 10 can flow off to a waste oil channel of the not shown connection block. Also the diameter $d_A$ of the circular round central opening 83 of the closing off segment 46 is larger than the diameter $d_F$ of the adjacent cross-shaped housing segment 45 and, in the illustrated special working embodiment, also slightly larger than the diameter $d_A$ of the central opening 73 of the connection segment 36. A piston 19 engaging operating element 144 can extend through the central opening 83 of the connection segment 46, as schematically shown in FIG. 2, by means of which the piston 19, for example, by motor control, is rotatable in the alternative rotation directions 21 or 27 about the central longitudinal axis 72 of the valve 10.

For a further explanation of the valve 10 an embodiment is envisioned wherein the intermediate sleeve 58 is introduced fixed in the central channel 71 of the housing 34 and the piston 19 is provided essentially rotatable, however axially non-displaceable.

The intermediate sleeve 58 is in this embodiment selected for illustrative purposes comprised of the ring disk shaped segments 61 through 69, which, in substantial analogy to the construction or assembly of the housing 34 of the valve 10, are welded rigidly with each other in coaxial arrangement with respect to their central longitudinal axis 72. The ring disk shaped segments 61 through 69 of the intermediate housing 58 have all the same inner diameter $d_i$ so that by the cumulativeness of the sleeve segments 61 through 69 a through-going, central, overall bore hole shaped channel 146 with circular-cylinder inner jacket surface is formed, in which the piston 19 is provided, which during the for explanation selected embodiment is produced in a segment construction manner analogous to that for the realization of the intermediate sleeve 58, with its flange-segments 48, 50, 52, 54 and 56 pressure tight slideably and rotatably.

Figure 1A:
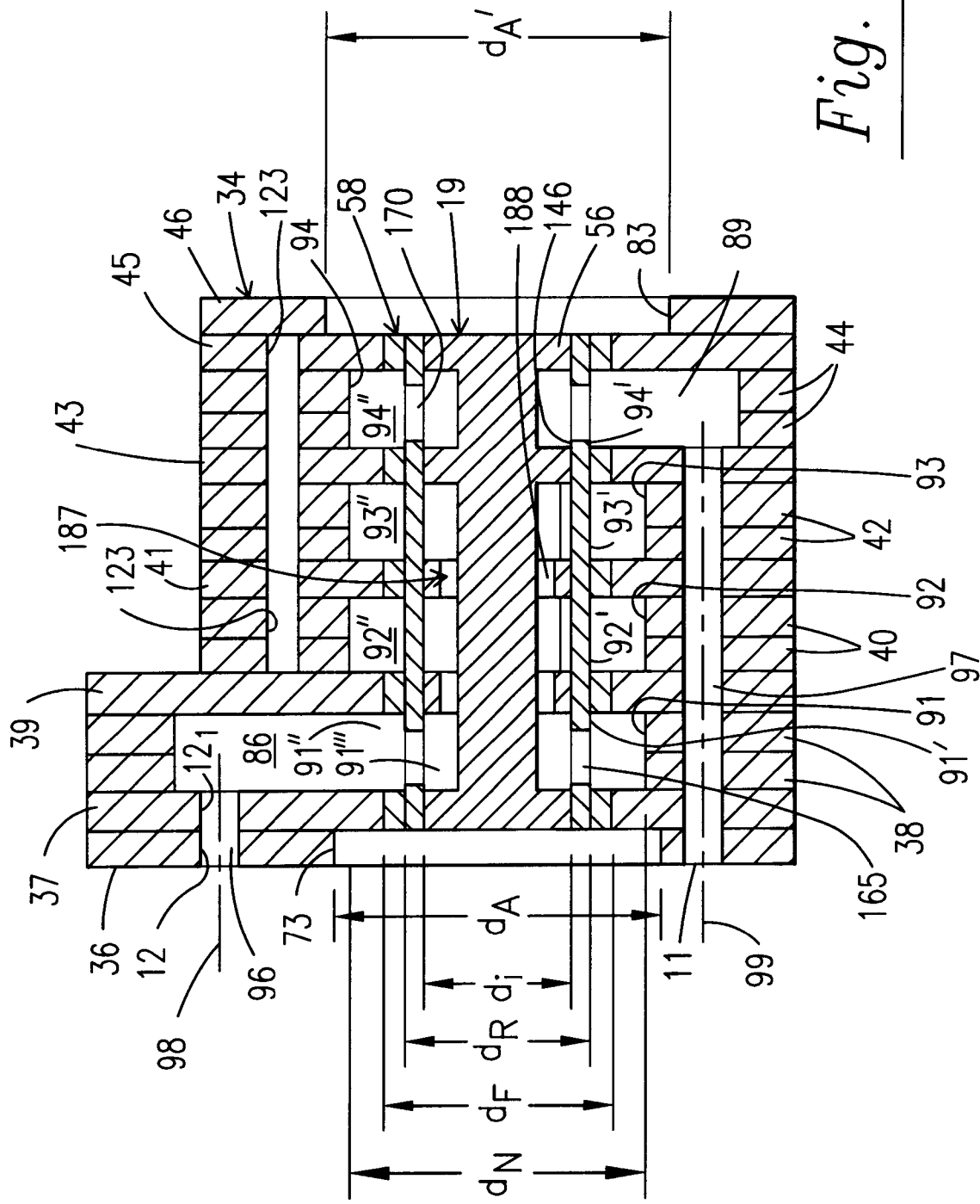

The intermediate sleeve 58 encompasses the self-enclosed ring flange-elements 61, 63, 65, 67 and 69 of the outer diameter $d_F$, as well as the between respective two of the ring flange element provided ring groove-segments 62, 64, 66 and 68 of the small outer diameter $d_R$ (FIG. 1a). By these ring shaped housing segments 61 through 69 there are formed radially outer ring grooves 91', 91', 93' and 94' of the intermediate sleeve 58, which together with the inner ring grooves 91 through 94 of the housing 34 produce essentially closed ring channels 91" through 94", namely the T-ring channel 91", which is in communicating connection with the T-return flow connection 12 of the valve, the A-ring channel 92", which is in communicating connection with the A-user connection 13 of the valve, the B-ring channel 93", which communicates with the B-user connection 14 of the valve 10, as well as the P-ring channel 94", which is in communication connection with the pressure (P)-supply connection 11 of the valve 10.

The axial thickness of the ring flange elements 61, 63, 65, 67 and 69 of the intermediate sleeve 58 correspond to the thicknesses of the ring flange segments 37, 39, 41, 43 and 45, of which the central openings 74, 76, 78 and 80 or, as the case may be, 82, the ring flange segments of the intermediate sleeve 58 are provided arranged in alignment of their ring face surfaces with the large surface bordering sides of the housing segments.

In the same sense the same thickness relation applies for the ring groove segments 62, 64, 66 and 68 of the intermediate sleeve 58 with respect to the thicknesses of the ring notch segments 38, 40, 42, and 44 of the housing 34 through which it axially extends.

The mentioned thickness relationship applies also for the flange segment 48, 50, 52, 54 and 56 as well also to the groove-segments 49, 51, 53 and 55 of the piston 19 provided between each two of these flange segments with respect to these segments 48 through 56 coaxially encompassing ring shaped shell segments 61 through 69 of the intermediate sleeve 58, in which the piston 19 is so provided that the outer end surfaces of its end flange segments 48 and 56 align with the outer ring face surface of the free ring flange segments 61 and 69 of the intermediate sleeve 58.

Figure 3A:
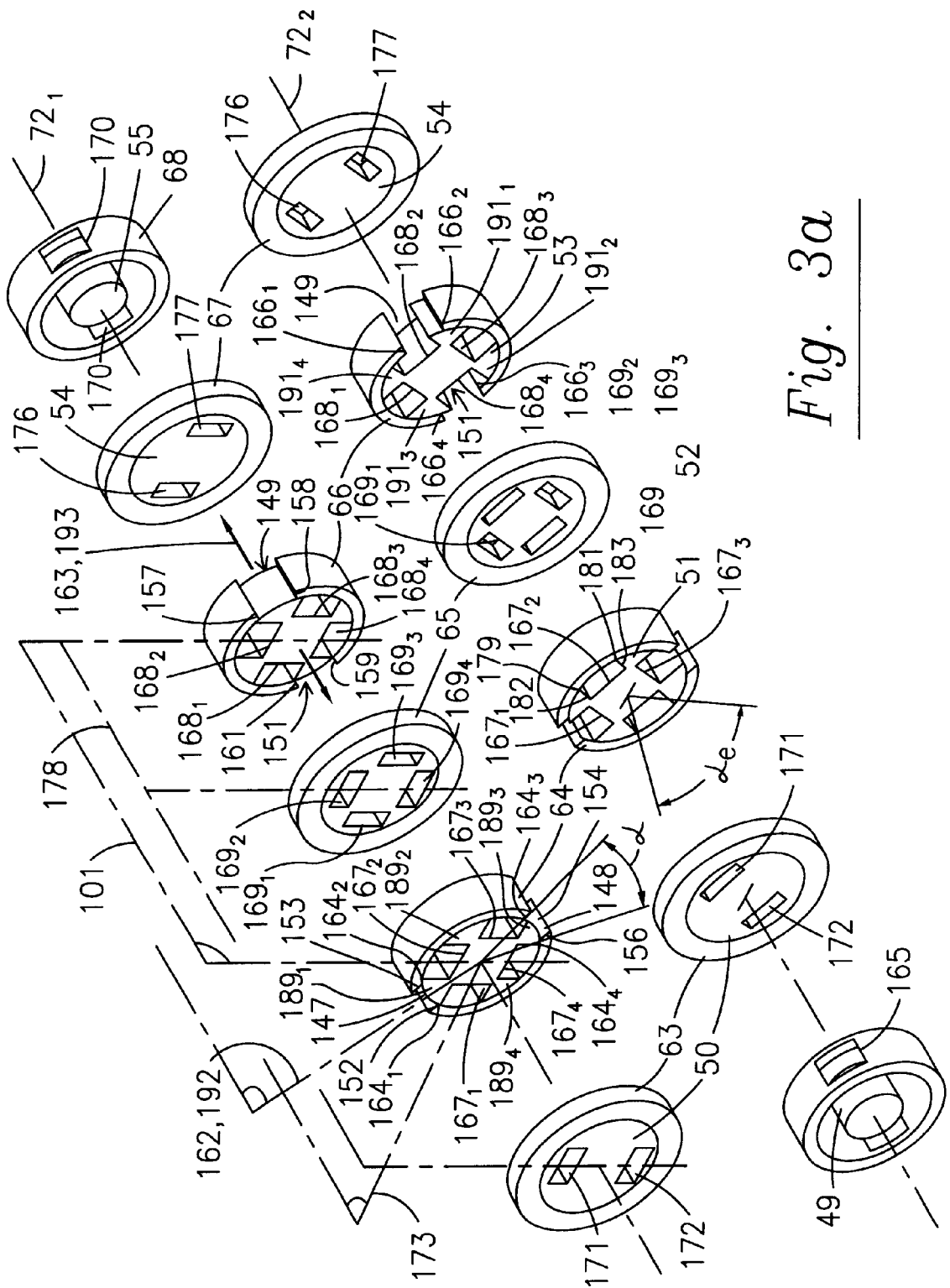

For further explanation of details of the intermediate sleeve 58 and the piston 19 reference is now made to the enlarged segment representation of FIG. 3a.

The ring notch segment 64 and 66 positioned respectively adjacent the central ring flange segment 65 of the intermediate sleeve 58, which form the radial inner border of the A-ring channel 92" or, as the case may be, the B-ring channel 93", are provided with respectively two axial and radial through-going control slits 147 and 148 or, as the case may be, 149 and 151 which after the welding together of the ring shaped sleeve segments 61 through 69 are formed by erosion. The control slits 147 and 148 of the ring groove segment 64, which radially internally border the A-ring space 92", and the control slits 149 and 151 which form the radial inner borders of the B-ring space 93" ring space segment 66 of the intermediate sleeve 58 are with respect to their central longitudinal axis 72 of the valve 10 respectively provided diametrically opposite to each other. The longitudinal bordering surfaces 152 and 153 of the inner control slit 147 and the longitudinal bordering surfaces 154 and 156 of the other control slit 148 of the A-groove segment 64 of the intermediate sleeve 58 run parallel to each other as well as parallel to the central longitudinal axis 72 of the valve 10, wherein respectively two longitudinal bordering surfaces 152 and 156 or as the case may be 153 and 154 align with each other.

Accordingly, also in the B-ring groove segment 66 of the intermediate sleeve 58 the longitudinal bordering surfaces 157 and 158 as well as 159 and 161 of its control slits 149 and 151 run parallel to each other and pair-wise in alignment.

The common longitudinal central plane 162 of the control slits 147 and 148 of the A-groove segment 64 which contain the central longitudinal axis 72 of the rotation slide valve, runs at a right angle to that of the central longitudinal axis 72 containing common longitudinal central plane 163 of the two control slits 149 and 151 of the B-groove segment 166 of the intermediate sleeve 58.

The between the radial inner longitudinal edges $164_1$ and $164_2$ of the control slit 147 and the radial inner longitudinal edges $164_3$ as well as $164_4$ of the control slit 148 of the A-groove segment 64 as well as the between the radial inner longitudinal edges $166_1$ and $166_2$ of the control slit 149 and the between the radial inner longitudinal edge $166_3$ and $166_4$ of the control slit 151 of the B-groove segment 66 of the intermediate sleeve 58, azimuthal width of the control slit 147 and 148 or as the case may be 149 and 151 correspond in the illustrative embodiment respectively to 90°.

The A-groove segment 64 and the B-groove segment 66 of the intermediate sleeve 58 are in the illustrative embodiment are oriented so "turned" with respect to each other, that the longitudinal central plane 162 and 163 of the control slits 147 and 148 of the A-groove segment 164 or as the case may be the control slit 149 and 151 of the B-groove segment 66 respectively enclose an angle of 45° with the vertical longitudinal plane 101 of the housing 34.

Also the piston 19 of the valve 10 which in the intermediate sleeve 58 is rotatably mounted wherein its flange-segment 48, 50, 52, 54 and 56 fluid tight-slideably on the inner jacket surface of the intermediate sleeve 58 lies, is in a with respect to the axial thickness of its piston segment 48 through 56 the axial thickness of the corresponding jacket segment 61 through 69 corresponding segment-constructionally of its ring disk shaped piston segments 48 through 56 formed, which again are solidly welded to each other.

Figure 1B:
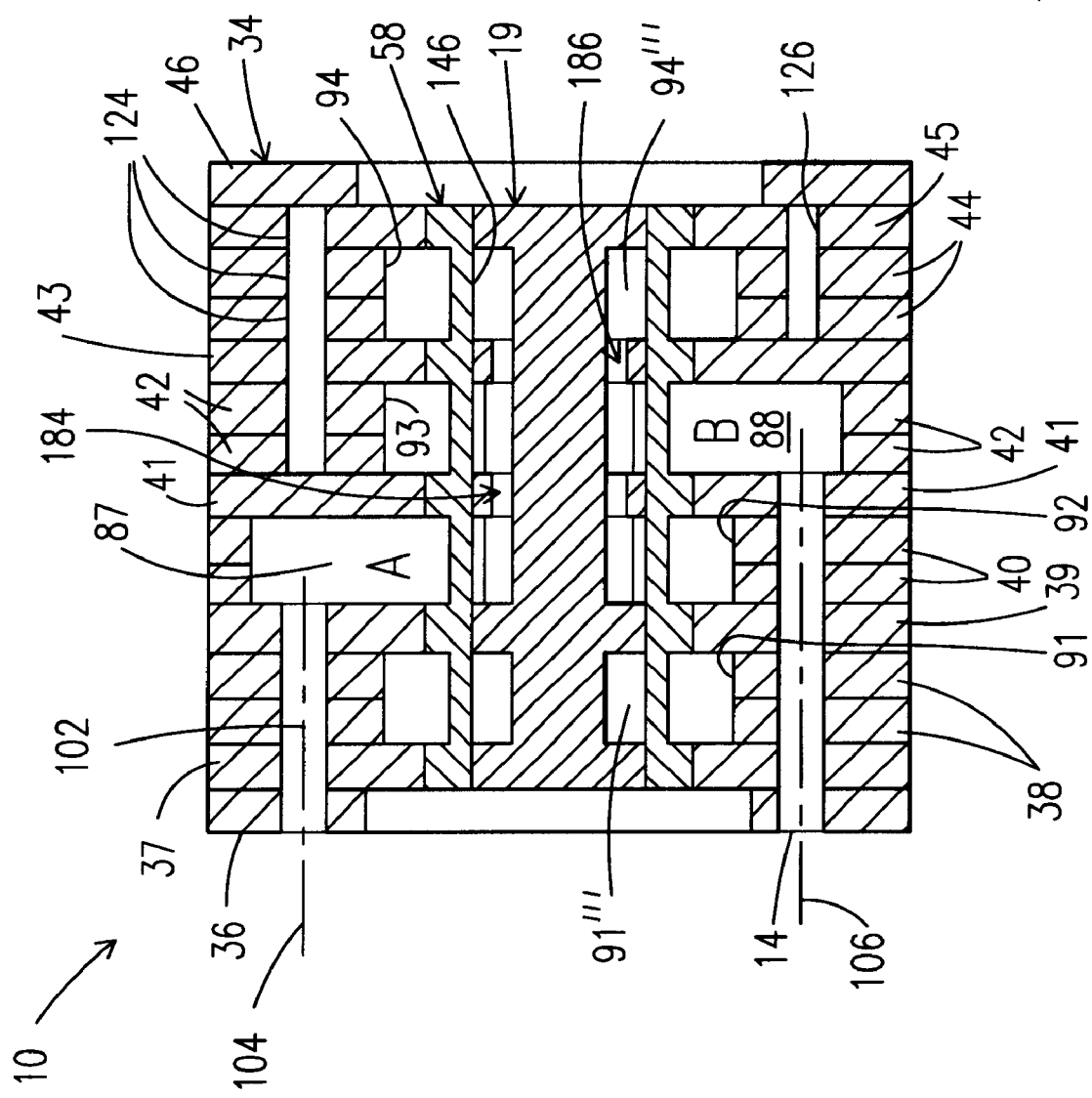
Figure 1D:
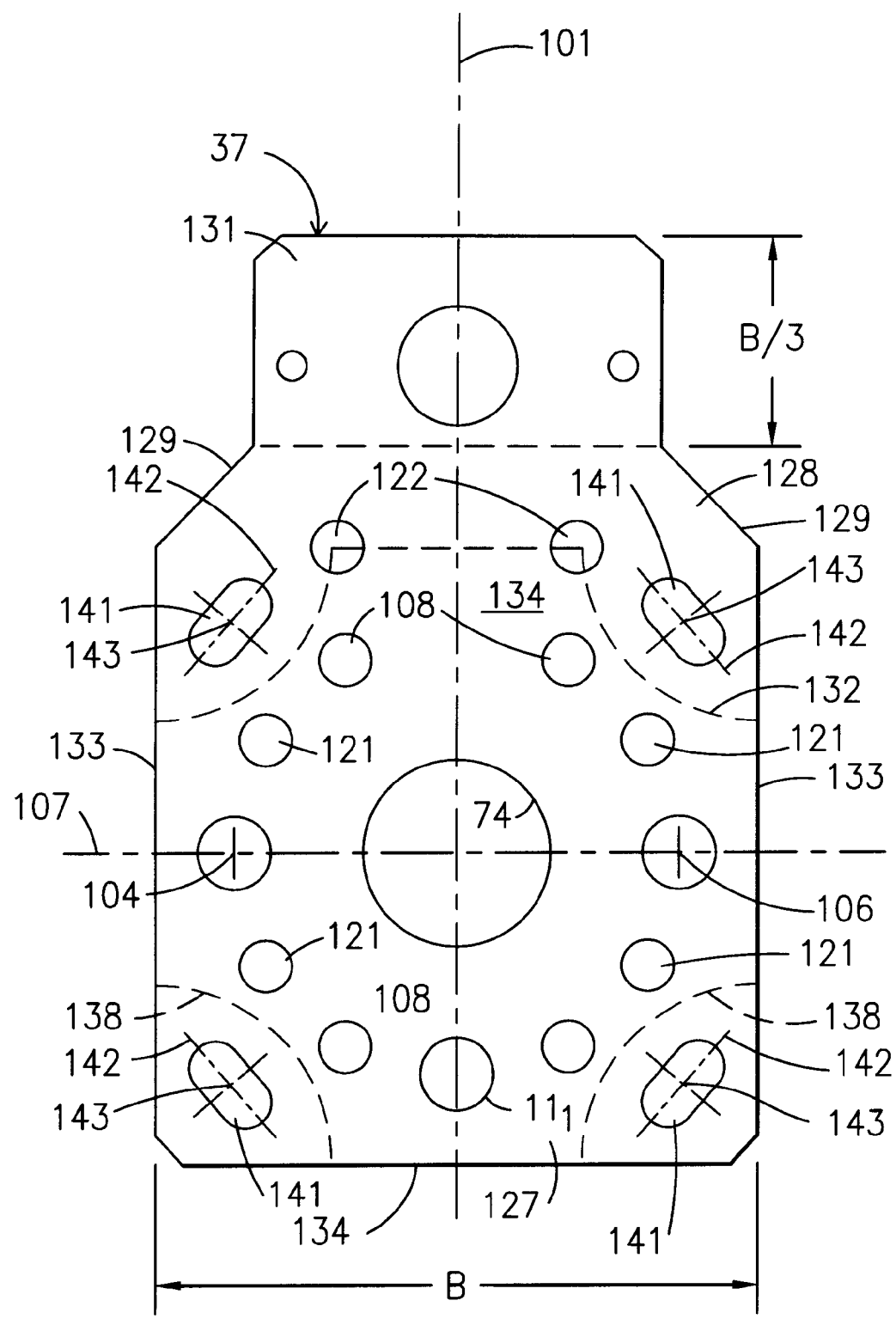
Figure 1C:
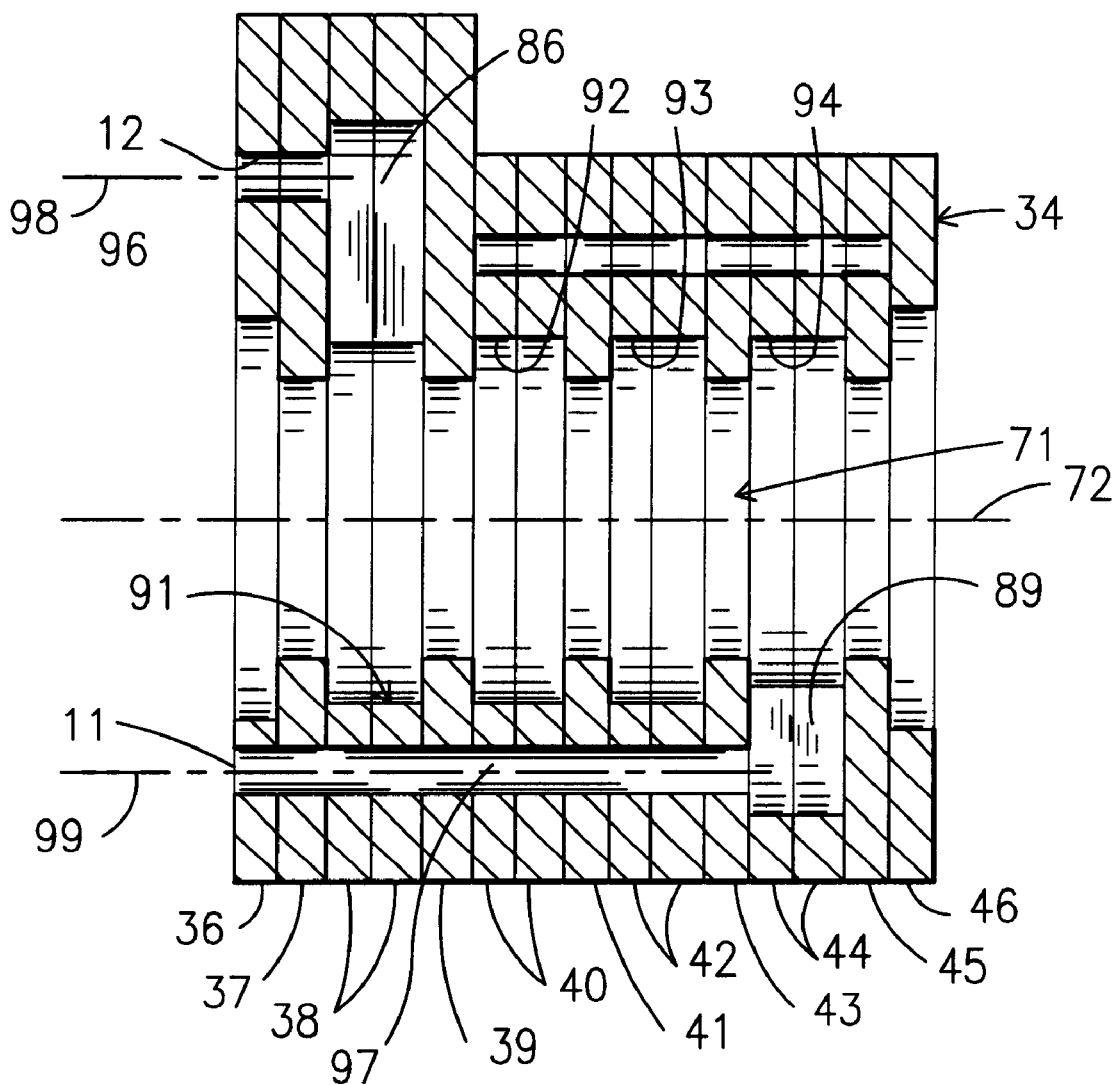

In the piston 19, for discussion of which reference can in particular be made to the detailed representation of FIG. 3a as well as the longitudinal sectional representation of FIGS. 1a and 1b, is by the connection side end flange segment 48, which has the same diameter $d_i$ as the next adjacent separation flange segment 50 and which forms in the intermediate T-groove segment 49 of the piston 19 a T-ring groove 91''', which via radial through-going transverse channels 165 of the T-ring groove segment 62 of the intermediate sleeve 58 is in constant communication connection with the T-ring space 91".

Through the other, on the operating side of the valve 10 provided end flange segment 56 of the piston 19 which has the same diameter $d_i$ as the next adjacent B-separation flange segment 54 and which between this position is provided P-groove segment 55 of smaller outer diameter is formed a P-ring groove 94''', which via radial transverse channels 170 of the T-ring groove segment 68 of the intermediate sleeve 58 is in constant communicating connection with the P-ring space 94" of the valve 10.

Between the A-separation flange segment 50 and the central ring flange segment 52 of same diameter $d_i$ of the piston 19 is provided, within the A-ring groove segment 64 of the intermediate sleeve 58, an A-control segment 51 of the piston 19, which is provided with a total of four radial outer open longitudinal grooves $167_1$ through $167_4$ extending between the A-separation flange segment 50 and the central ring flange 152.

A B-control segment 53 of the piston 14 is provided between the B-separation flange segment 54 and the central ring flange segment 52 of the piston 19 within the B-ring notch segment 66 of the intermediate sleeve 58, which again is provided with a total of four radially outer open longitudinal notches $168_1$ through $168_4$ extending themselves between the B-separation flange segment 54 and central ring flange segment 52 of the piston 19. The longitudinal grooves $167_1$ through $167_4$ of the A-control segment 51 and the longitudinal grooves $168_1$ through $168_4$ of the B-control segment 53 are provided in groups of four axially symmetric with respect to the central longitudinal axis 72' of the piston 19, wherein the longitudinal grooves $167_1$ through $167_4$ of the A-control segment 51 and the longitudinal grooves $168_1$ through $168_4$ of the B-control segment 53 of the piston 19 pair-wise are aligned with each other. These in longitudinal direction pair-wise with each other aligned longitudinal notches of the A-control segment 51 and the B-control segment 53 are connected by closed right-angled edged throughput channels $169_1$ through $169_4$ of the central ring flange segment 52 appropriately communicating pair-wise with each other.

The piston-fixed common longitudinal central plane 173 of the each other diametrically oppositely lying longitudinal grooves $167_1$ and $167_3$ of the A-control segment 51, which each other diametrically oppositely lying arranged throughput channels $169_3$ and $169_3$ of the central ring flange 52 as well as the diametrically oppositely lying longitudinal grooves $168_1$ and $168_3$ of the B-control segment 153 is also the common longitudinal central plane of the diametrically oppositely lying P-throughput channels 176 and 177 of the B-separation flange segment 154 of the piston 19, via which the respective, with each other aligned, longitudinal grooves of the A-control segment 51 and the B-control segment 53 as well as the with this communicating throughput channel $169_1$ and $169_3$ of the central ring flange segments 52 with the P-ring notch 94''' of the piston 19 are in constant communicating connection.

The to the first mentioned piston fixed longitudinal central plane 173 right angled running, piston fixed, common longitudinal middle plane 178 of the respective other two, each other diametrically oppositely lying longitudinal grooves $167_2$ and $167_4$ of the A-control segment 51, the diametrically oppositely lying arranged through channel $169_2$ and $169_4$ of the central ring flange segment 52 as well as the further diametrically oppositely lying longitudinal groove $168_2$ and $168_4$ of the B-control segment 53 is also a common longitudinal middle plane of the diametrically oppositely lying T-throughput channels 171 and 172 of the A-separation flange segment 50 of the piston 19, via which the respective with each other aligned longitudinal notches $167_2$ and $167_4$ as well as $168_2$ and $168_4$ of the A-control segment 51 or as the case may be B-control segment 53 as well as this communicating throughput channels $169_2$ and $169_4$ of the central ring flange segment 52 are in constant communicating connection with the T-ring notch 91''' of the piston 19.

The effective azimuthal width of the longitudinal notches $167_1$ through $167_4$ of the A-control segment as well as longitudinal groove $168_1$ and $168_4$ of the B-control segment 53 of the piston 19, which is determined by the angular separation of the radial outer longitudinal edge 179 and 181 of their parallel to each other running groove side edge surfaces 182 and 183, corresponds to 90° and is therewith at the same time the azimuthal separation of the radial inner longitudinal edge $164_1$ and $164_2$ as well as $164_3$ and $164_4$ of the axial control slit 147 and 148 of the A-ring groove segment 64 of the intermediate sleeve 58 (the same relation applies for the longitudinal grooves $168_1$ through $168_4$ of the B-control segment 53 of the piston 19 and the with this coaxial ring groove segment 66 of the intermediate sleeve 58).

An output present on the P-supply connection 11 of the valve pressure P of the pressure supply aggregate 29 (FIG. 2) is coupled in via the P-longitudinal channel 97 (FIG. 1a) of the housing 43 also in this P-ring channel 97" and from the same via the radial transverse channel 170 of the intermediate sleeve 58 in the P-ring groove 94''' of the piston 19 as well as in the two P-control channels 184 and 186 (FIG. 1b), which extends itself beginning with the P-throughput channels 176 and 177 of the B-separation flange segment 54 of the piston 19 up to the A-separation flange segment 50 of the piston 19, which closes off the P-control channel 184 and 186 against the T-ring groove 91''' if the piston 19. Further there are T-control channels 187 and

188 (FIG. 1a) which, beginning with the T-throughput channels 171 and 172 of the A-separation flange segment 50, extend up to the B-separation flange segment 54 of the piston 19 and through these against the P-ring groove 94''' of the piston 19 are blocked off, connected communicating with the tank 32 of the pressure supply aggregate 29.

In the base position 0 of the valve 10 the P-control channels 184 and 186 as well as the T-control channels 187 and 188 are blocked off against the A-connection groove 92 and the B-connection groove 93 of the housing 34. This blockage function of the valve 10 in its base position 0 is then given, when the control slits 147 and 148 of the A-ring groove segment 64 as well as the control slits 149 and 151 of the B-ring groove segments 66 of the intermediate sleeve 58 through respectively two of the diametrically oppositely lying in cross-section sector shaped longitudinal posts $189_1$ through $189_4$ and $191_1$ through $191_4$ of the A-control segment 51 or as the case may be the B-control segment 53 of the piston 19, with their longitudinal grooves $167_1$ through $167_4$ or as the case may be $168_1$ through $168_4$ azimuthally block off against each other, are radially closed.

This is in the embodiment 10 selected for explanation purposes, for which a housing-fixed arrangement of the intermediate sleeve 58 was presumed, then the case, when the piston fixed, respectively common longitudinal middle plane 192 and 193 of the pair-wise oppositely arranged sector shaped longitudinal cross-pieces $189_1$ through $189_4$ of the A-control segment 151 or as case may be the B-control segment 53 of the piston 19 have the same orientation as the housing fixed longitudinal middle plane 162 and 163 of the control slits 147 and 148 of the A-ring groove segment 64 or as the case may be the control slit 149 and 151 of the B-ring segment 66 of the intermediate sleeve 58 which with the vertical longitudinal middle plane 101 of the housing 34 encloses an angle of respectively 45°.

The base position 0 of the valve 10 corresponds to the configuration of the ring disk shaped segments 61 through 69 of its intermediate sleeve 58 shown exploded along the axis $72_1$ in the FIGS. 3 and 3a as well as the circular disk shaped segments 48 through 56 of the valve piston 19.

In this base position the radial outer longitudinal edges 179 and 181 of the groove side-wall-longitudinal surfaces 182 and 183, between which pair-wise also the curved edges of the sector shaped longitudinal cross-member $189_1$ through $189_4$ as well as $191_1$ through $191_4$ of the A-control segment 51 or as case may be the B-control segment 53 of the piston 19 extend, with the same registry with the radial inner longitudinal edges $164_1$ through $164_4$ and $166_1$ through $166_4$ of the control slits 147 and 148 of the A-ring groove segment 64 of as the case may be the control slits 149 and 151 of the B-ring groove segment 166 provided.

Beginning with the base position 0 of the valve 10, this arrives by turning of the piston 19 in the direction of the arrow 21 of FIG. 3 in the along the central axis $72_2$ exploded represented configuration of its intermediate sleeve segments 61 through 69 as well as the piston segments 48 through 56, in which by overlapping the interstitial space cross-sections of the longitudinal grooves $167_1$ and $167_3$ of the A-control segment 51 of the piston 19 which with the interstitial space cross-sections of the control slits 147 and 148 of the A-ring groove segment 64 of the A-user connection 13 of the valve 10 is connected with its P-supply connection 11 and through the overlapping of the interstitial space cross-sections of the longitudinal grooves $168_2$ and $168_4$ of the B-control segment 53 of the piston 19 with the interstitial space cross-sections of the control slits 149 and 151 of the B-ring segments 66 of the B-user connection 14 of the valve 10 is connected with its T-return flow connection 12, that is, the valve 10 assumes the functional position I.

Alternatively thereto, the valve 10 is brought into, again beginning with its base position 0, by rotation of its piston 19 in the direction of the arrow 27 in FIG. 3 in the along the central longitudinal axis $72_3$ of in FIG. 3 exploded represented configuration of its intermediate sleeve segments 61 through 69 as well as the piston segments 48 through 56, in which through the overlapping of the interstitial space cross-sectional segments of the longitudinal grooves $167_2$ and $167_4$ of the A-control segments 51 of the piston 19 with the interstitial space cross-sectional segments of the control slit 147 and 148 of the A-ring groove segment 64 the A-user connection 13 of the valve 10 is connected with its T-return flow connection 12 and through the overlapping of the interstitial cross-sectional segments of the longitudinal grooves $168_2$ and $168_4$ of the B-control segments 53 of the piston 19 with the interstitial space cross-sectional segments of the control slits 149 and 151 of the B-ring groove segments 66 of the intermediate sleeve 58 the B-supply connection 14 of the valve 10 is connected with its P-supply connection 11, that is, the valve 10 assumes its functional position II.

Figure 4:
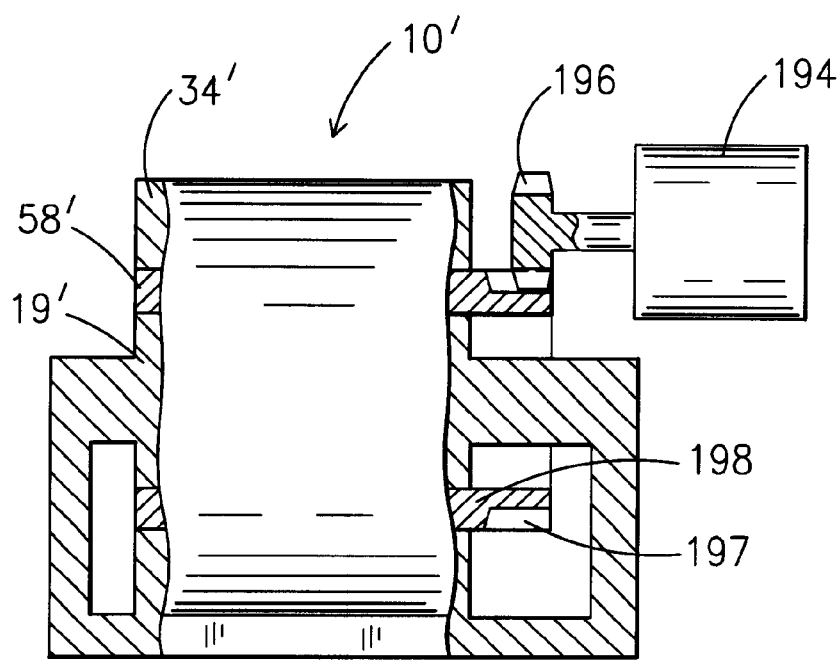

A hydraulic valve 10' with functional positions and path connections explained by way of example on the basis of FIGS. 1 through 3 is also, as represented in schematically simplified manner in FIG. 4, realizable in the manner, that the housing 34 of the valve 10 is fixedly connected with its piston 19' and the intermediate sleeve 58' is provided rotatably relative to the unitary construction formed by the piston 19' and the housing 34'.

As control drive for the housing 58' there may suitably be employed for example an electric motor 194 with reversible direction of rotation, which drives a pinion gear 196, which engages with an outer teething 197 of an end segment 198 of the intermediate sleeve 58' extending out from the housing 34'.

Figure 5:
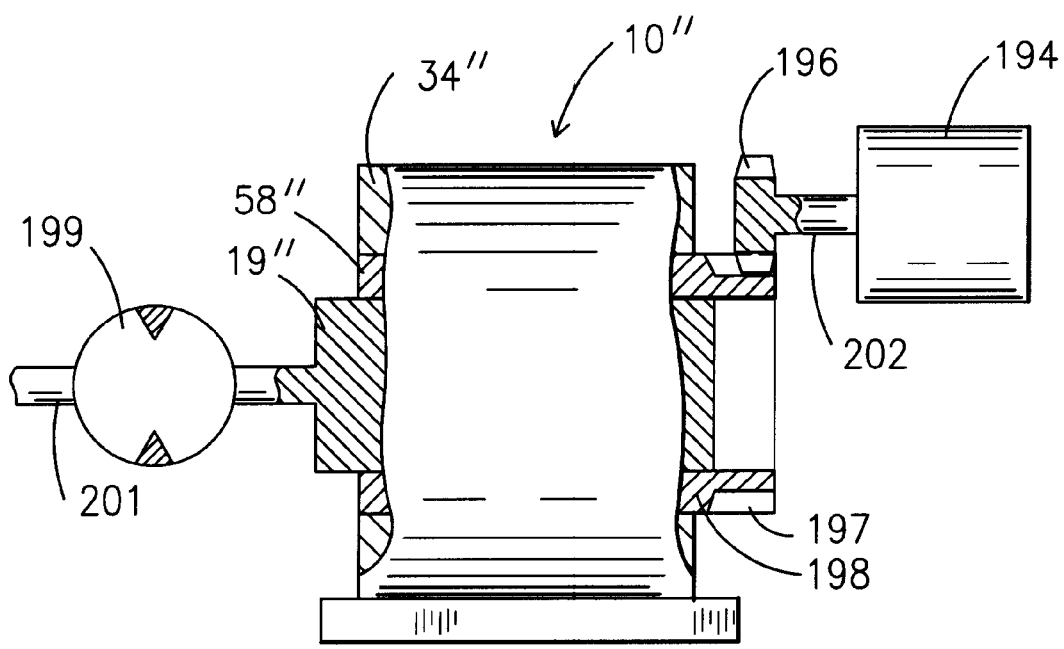

This type of control is also envisioned in the rotary slide valve 10" represented in FIG. 5, in which both the intermediate sleeve 58" as well as also the central piston 19' are constructed to be rotatable relative to each other and to the housing 34". This rotary slide valve 10" is formed as a follow-up control valve, which is employable for example for drive control of a rotary-hydraulic motor 199, of which the drive shaft 201 is fixed against rotation or via a not shown slit free drive, that is, a tooth gear drive without play, is rotatingly moveably coupled with the piston 19", which is employed as "mechanical" feedback element for the respective azimuthal position of the drive shaft 201 of the hydraulic motor 199. The desired value input for this position is achieved by the driving of the intermediate sleeve 58" by means of the pinion 196 driven electric motor 194, which in this case advantageously is digitally controllable, that is, is controllable by a series of electrical impulses, wherein each of these impulses corresponds to a rotation of the pinion 196 about a defined, incremental rotation angle $\Delta\phi$, which is also associated with an incremental rotation angle $\delta\phi$ of the motor shaft 201 of the hydraulic motor 199. The relationship $\delta\phi/\Delta\phi$ is hereby determined by the transmission translation, with which the rotatorial movement of the drive shaft 202 of the drive control motor 194 transmits upon the intermediate sleeve 58" and the rotation of the drive shaft 201 of the control hydraulic motor 199 or as the case may be upon the piston 19" is fed back to the servo-regulator valve 10".

It is understood, that a follow up control valve constructed as a rotary slide valve of the type described with reference to FIG. 5 could also be realized in the manner, that the desired position value-input for the drive-controlled element is produced by electric controlled drive of the valve piston and the position-actual-value feed-back is produced by rotational coupling of the drive controlled element with the intermediate sleeve of the follow up control valve.

In particular in the embodiment of valves 10 and 10" discussed on the basis of FIG. 4 and 5 in which the intermediate sleeve 58' or as the case may be 58" moveably is provided, it is advantageous, that the under high initial pressure of the pressure supply aggregate 29 existing P-throughput channel 169₁ and 169₃ of the central ring flange segment 52 of the piston as well the P-throughput channel 176 and 177 of the B-separation flange segment 54 within its segments 53 and 54 is closed edged, so that in the area of the central ring flange segment 52 as well as in the area of the B-separation flange segments 54 a through the pressure caused radial force upon the intermediate sleeve 58' or as the case may be 58" is avoided, which would have the tendency to spread apart the this ring flange segment 52 and 54 of the piston 19 circumscribing ring flange element 56 and 57 of the intermediate sleeve and thus contribute to an overall difficulty of movement of the intermediate sleeve. This reduction of the tendency to spreading apart and therewith to increase rubbing friction upon the housing acting forces is, thanks to the segment construction manner of the piston 19, in simple manner made possible, which therewith also in functional respects imparts the advantage of a high functional reliability.

What is claimed is:

1. A hydraulic valve, comprising:
    a valve housing composed of planar parallel, plate-shaped segments (36–46), the valve housing (34) having a longitudinal axis (72), longitudinal channels, radial channels, a central valve channel (71), and central channel widening grooves defined therein, wherein:
        said longitudinal channels (96, 97) are comprised of channel segments formed by through-holes through said plate-shaped segments, said through-holes having a cross-section with a closed edge, said channel segments being in communication with adjoining channel segments of adjacent plate-shaped segments to form said longitudinal channels,
        said central valve channel (71) is formed by adjoining central openings (75, 77, 79 and 81) of adjacent housing segments (38, 40, 42 and 44),
        said radial channels are in communication with a supply connection (11, 12) or a user connection (13, 14), and said radial channels or segments of such channels are formed by radial extensions (86–98) of said central openings (75, 77, 79 and 81) of said plate-shaped valve housing segments (38, 40, 42 and 44), and
        said central channel widening grooves (91, 92, 93 and 93) widen the cross-section of the central channel (71); and
    a valve piston (19) mounted in said central valve channel (71) for movement in at least one of sliding in the longitudinal direction and rotation in a pressure-tight manner;
    wherein various functional positions of the valve piston relative to the valve piston housing define various combinations or subcombinations of flow paths, wherein segments of such flow paths are formed by said grooves and channels in at least one of the housing and the piston, which flow path sections are in fluid communication with at least one of (a) each other, (b) pressure-connections, (c) tank-connections, and (d) user connections;
    and wherein said valve housing plate-shaped segments (36–46) are joined by brazing after at least one of form-fittingly and materially assembling said plates into a dimensionally stable package with brazing material introduced into closed compartments which are formed by groups of interconnected through-holes (121 to 124, 126) of the segment plates (37–45), which compartments extend over the whole series of joints of the segment plates (36 to 46).

2. A hydraulic valve according to claim 1, wherein said valve housing is composed of planar parallel, plate-shaped segments (36–46) including end plates (36 and 46), and wherein receiver compartments for soldering material are provided, which extend over the entire length of the valve housing between the end plates (36 and 46).

3. A hydraulic valve according to claim 1, wherein at least one of said closed compartments into which brazing material is introduced forms a continuous channel contacting every valve housing plate shaped segment.

4. A hydraulic valve according to claim 1, wherein preformed chambers for receiving of brazing material are arranged axially symmetrically with respect to this central longitudinal axis (73) of the central channel (71) of the housing (34).

5. A hydraulic valve according to claim 1, wherein the plate shaped segments (36 through 46) for the brazing process are held together by fixing posts (116 through 119), which extend between the end segments (36 and 46) of the segment package through aligned fastening through-holes (108).

6. A hydraulic valve according to claim 5, wherein said valve housing is composed of planar parallel, plate-shaped segments (36–46) including end plates (36 and 46), and wherein post-shaped metal fasteners are provided as fixing elements, which at least on one side of the packet are riveted with the corresponding end face plate (36 or 46).

7. A hydraulic valve according to claim 5, wherein the fixing posts (116 through 119) are respectively riveted to one end face plate (36 and 46).

8. A hydraulic valve according to claim 5, wherein the diameter of the fixing posts (116 through 119) corresponds to the diameter of the aligned fastening through-holes (108) of the housing segments (136 through 146).

9. A hydraulic valve according to claim 1, wherein the plate-shaped segments (36 through 46) of the housing (34) are force form lockingly held together by wedging over with an anchoring body introduced into aligned edge open recesses of the plate shaped segments (36 through 46).

10. A hydraulic valve according to claim 9, wherein the edge open recesses aligned with each other form a longitudinal notch with an outwardly narrowing, trapezoid shaped interstitial area cross section in which a slightly warped anchoring body is introduceable which by pressing into the notch produces the force form locking anchoring of the plate shaped segments (36 through 46).

11. A hydraulic valve according to claim 1, wherein the plate shaped segments (36 through 46) of the housing (34) are materially lockingly connected with each other by a least one outer weld bead.

12. A hydraulic valve according to claim 1, wherein at least some of the plate shaped segments (36 through 46), which are provided adjacent to each other, are provided with coaxially aligned projections and recesses of approximately complimentary shape and wherein said plate shaped segments are engaged by pressing in of the projections of one segment plate into the recesses of an adjacent segment plate.

13. A hydraulic valve according to claim 12, wherein the projections on one side of said plate shaped segments are formed by the material from stamped out recesses of the opposite side of said plate shaped segments, in which the stamping stroke which formed the recesses extends only through a part of the material thickness of the respective segment plate.

14. A hydraulic valve according to claim 1, wherein the valve piston (14) is comprised of circular disk shaped segment plates (48 through 56) solidly welded with each other.

15. A hydraulic valve according to claim 1, wherein an intermediate sleeve (58) is provided introduced in the central channel (71) of the housing (34), which co-axially encompasses the piston (19) and for its part is comprised of ring shaped, solidly with each other welded segments (61 through 69) of the same inner diameter $d_i$.

16. A hydraulic valve according to claim 15, wherein the intermediate sleeve (58) is connected fixedly with the housing (34) of the valve and the piston (19) is provided moveably in the intermediate sleeve (58).

17. A hydraulic valve according to claim 15, wherein the intermediate sleeve (58) is fixedly connected with the piston (19) of the valve (10) and wherein the unitary element formed by the intermediate sleeve (58) and the piston (19) collectively is moveable relative to the housing (34) of the valve (10).

18. A hydraulic valve according to claim 15, wherein the piston (19) of the valve (10) is fixedly connected with the housing (34), and the intermediate sleeve (58) is provided moveable relative to said housing.

19. A hydraulic valve according to claim 15, wherein both the piston (19) as well as the intermediate sleeve (58) are moveable relative to the housing (34) as well as with respect to each other.

20. A hydraulic valve according to claim 1, wherein two of said closed compartments into which brazing material is introduced together contacting every valve housing plate shaped segment and with respect to each other are interrupted by only one segment.

21. A hydraulic valve according to claim 1, wherein the thickness of the plate shape segments (38, 40, 42, 44) of the housing (34), of which the central opening defining edges (75, 77, 79, 81) form the base groove of central channel (71) widening grooves (91, 92, 93, 94), correspond to the axial separation between the groove side-wall forming segment plates (37, 39, 41, 43, 45) or a normal breech of this separation.

22. A hydraulic valve according to claim 21, wherein the plate shaped segments (36 through 46) of the valve housing (34) have the same thickness.

23. A hydraulic valve according to claim 1, wherein the thickness of plate segments (39, 41, 43) corresponds to one of (a) the side walls of a ring flange separating two housing ring grooves (91, 92, 93, 94) from each other, and (b) a natural breech of the same.

24. A hydraulic valve as in claim 1, wherein said valve piston includes piston grooves.

25. A hydraulic valve as in claim 1, wherein said valve piston includes piston channels.

* * * * *